US012570854B2

(12) United States Patent
Hosoda et al.

(10) Patent No.: US 12,570,854 B2
(45) Date of Patent: Mar. 10, 2026

(54) HIGH THERMAL CONDUCTIVE SILICONE COMPOSITION

(71) Applicant: SHIN-ETSU CHEMICAL CO., LTD., Tokyo (JP)

(72) Inventors: Narimi Hosoda, Annaka (JP); Toko Takahashi, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 611 days.

(21) Appl. No.: 17/922,895

(22) PCT Filed: Apr. 29, 2021

(86) PCT No.: PCT/JP2021/017129
§ 371 (c)(1),
(2) Date: Nov. 2, 2022

(87) PCT Pub. No.: WO2021/235214
PCT Pub. Date: Nov. 25, 2021

(65) Prior Publication Data

US 2023/0167301 A1 Jun. 1, 2023

(30) Foreign Application Priority Data

May 22, 2020 (JP) ................................ 2020-089709

(51) Int. Cl.

| | |
|---|---|
| ***C08F 2/46*** | (2006.01) |
| ***C08F 2/50*** | (2006.01) |
| ***C08G 61/04*** | (2006.01) |
| ***C08K 3/08*** | (2006.01) |
| ***C08L 83/04*** | (2006.01) |

(52) U.S. Cl.
CPC ................ *C08L 83/04* (2013.01); *C08K 3/08* (2013.01); *C08K 2003/0812* (2013.01); *C08K 2201/005* (2013.01); *C08L 2205/02* (2013.01); *C08L 2205/03* (2013.01); *C08L 2314/08* (2013.01)

(58) Field of Classification Search
CPC ...... C08L 83/04; C08L 83/00; C08L 2205/03; C08L 2205/02; C08L 2314/08; C09K 5/14; C08G 77/18; C08G 77/20; C08G 77/12; C08K 3/08; C08K 3/22; C08K 5/56; C08K 5/3475; C08K 2201/005; C08K 2003/0812; C08K 2201/001; C08K 2201/014
USPC .............................. 252/75, 74, 72, 71; 520/1
See application file for complete search history.

(56) References Cited

U.S. PATENT DOCUMENTS

| | | | |
|---|---|---|---|
| 6,306,957 B1 | 10/2001 | Nakano et al. | |
| 2003/0127496 A1 | 7/2003 | Tetsuka et al. | |
| 2011/0163460 A1 | 7/2011 | Kato et al. | |
| 2016/0060462 A1 | 3/2016 | Kitazawa et al. | |
| 2016/0068732 A1* | 3/2016 | Kitazawa ................ | C08L 83/00 252/75 |
| 2016/0096934 A1 | 4/2016 | Heikkila et al. | |
| 2016/0096984 A1 | 4/2016 | Matsumoto | |
| 2017/0260392 A1 | 9/2017 | Kitazawa et al. | |
| 2018/0022977 A1 | 1/2018 | Tsuji | |
| 2019/0002694 A1 | 1/2019 | Akiba et al. | |
| 2022/0380548 A1 | 12/2022 | Yamada et al. | |

FOREIGN PATENT DOCUMENTS

| | | |
|---|---|---|
| CN | 101265362 A | 9/2008 |
| CN | 101294067 A | 10/2008 |
| CN | 105164208 A | 12/2015 |
| CN | 105246977 A | 1/2016 |
| CN | 107001802 A | 8/2017 |

(Continued)

OTHER PUBLICATIONS

LI Guo-yi, et al., "Preparation and Properties of Thermal Conductive Silicone Encapsulant," Silicone Material, vol. 24, No. 5, pp. 283-287.
Xiaowen, Ren, et al., "Study on modification and oil penetration of the new thermal silicone grease," New Chemical Materials, vol. 47, No. 11, pp. 134-136, 140.
Anitha C. et al., "Influence of particle size in fluorine free corrosion resistance superhydrophobic coating—Optimization and stabilization of interface by multiscale roughness," Journal of Alloys and Compounds, vol. 765, pp. 677-684.

(Continued)

*Primary Examiner* — Jessica Whiteley
(74) *Attorney, Agent, or Firm* — Oliff PLC

(57) ABSTRACT

A high thermal conductive silicone composition including: (A) an organopolysiloxane having at least two aliphatic unsaturated hydrocarbon groups in one molecule and a kinematic viscosity at 25 C of 100 to 100,000 $mm^2/s$; (B) an aluminum powder having an average particle size of 50 μm or more; (C) a thermal conductive filler having an average particle size of 0.1 to less than 50 μm; (D) an organohydrogenpolysiloxane having two or more hydrogen atoms bonded to a silicon atom (Si—H groups) in one molecule; (E) a hydrolyzable organopolysiloxane represented by the following general formula (1); and (F) a platinum group metal catalyst having an effective amount. The high thermal conductive silicone composition can conform to the warpage of a substrate due to an increased material thickness and can maintain heat dissipation performance due to a high thermal conductivity.

(1)

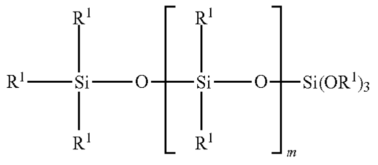

4 Claims, No Drawings

(56) References Cited

FOREIGN PATENT DOCUMENTS

| | | | |
|---|---|---|---|
| CN | 107406678 | A | 11/2017 |
| CN | 108603033 | A | 9/2018 |
| EP | 2995651 | A1 | 3/2016 |
| EP | 4050068 | B1 | 1/2025 |
| JP | 2938428 | B1 | 8/1999 |
| JP | 2938429 | B1 | 8/1999 |
| JP | 2000-256558 | A | 9/2000 |
| JP | 2004-210856 | A | 7/2004 |
| JP | 3952184 | B2 | 8/2007 |
| JP | 2010-013521 | A | 1/2010 |
| JP | 2010-059237 | A | 3/2010 |
| JP | 2014-037460 | A | 2/2014 |
| JP | 2014-080546 | A | 5/2014 |
| JP | 2016-11322 | A | 1/2016 |
| JP | 2016-098337 | A | 5/2016 |
| JP | 2019-001900 | A | 1/2019 |
| WO | 2014/181657 | A1 | 11/2014 |
| WO | 2014/188667 | A1 | 11/2014 |
| WO | 2017/159252 | A1 | 9/2017 |
| WO | 2018/230189 | A1 | 12/2018 |

OTHER PUBLICATIONS

Chiu, Hsien-Tang et al., "Thermal conductivity and electrical conductivity of silicone rubber filled with aluminum nitride and aluminum powder," Journal of Polymer Engineering, vol. 33, No. 6, pp. 545-549.

Feb. 6, 2024 Office Action issued in Chinese Patent Application No. 202180036987.0.

Mar. 18, 2025 Office Action issued in European Patent Application No. 21809031.4.

Jun. 22, 2021 Search Report issued in International Patent Applciation No. PCT/JP2021/017129.

Nov. 17, 2022 International Preliminary Report on Patentability issued in International Patent Application No. PCT/JP2021/017129.

May 6, 2024 Extended European Search Report Issued in European Patent Application No. 21809031.4.

Sep. 24, 2024 Office Action issued in Taiwanese Patent Application No. 110115970.

May 9, 2023 Office Action issued in Japanese Patent Application No. 2022-524364.

Nov. 22, 2025 Office Action issued in Korean Patent Application No. 10-2022-7040004.

* cited by examiner

HIGH THERMAL CONDUCTIVE SILICONE COMPOSITION

TECHNICAL FIELD

The present invention relates to a high thermal conductive silicone composition that can maintain high heat dissipation performance.

BACKGROUND ART

It is widely known that electronic parts such as LSIs and IC chips generate heat in use, thereby lowering the performances thereof. As means for solving this problem, various heat dissipating techniques have been used. For example, it is known that arranging a member for cooling such as a heat sink near a heat generating part and bringing both into close contact with each other promotes efficient heat transfer to the cooling member and thus cooling of the cooling member efficiently dissipates heat from the heat generating part. In this event, if there is a space between the heat generating member and the cooling member, heat transfer becomes inefficient because of the presence of air, which is poor in thermal conduction property, so that the temperature of the heat generating member cannot be reduced sufficiently.

In order to prevent such a phenomenon, heat dissipation sheets and heat dissipation greases are used as heat dissipating materials that have good thermal conductivity and conformability to the surface of the members for preventing the presence of air between the heat generating member and the cooling member (Patent Documents 1 to 3). Among the heat dissipating materials, the heat dissipation grease exhibits high performance from the viewpoint of heat resistance because it can be used with a reduced thickness in mounting. The heat dissipation grease also includes a type that is sandwiched between members and then is heat-cured for use.

The heat dissipation grease is blended with a large amount of filler to improve thermal conduction property, but as a result, the elongation after heat curing becomes reduced. The reduction in elongation causes the material to lose its flexibility, resulting in a concern that the material will not be able to conform to the warpage during operation. The lack of conformability generates a space between the member and the heat dissipation grease, resulting in deterioration of the heat dissipation performance. In order to solve this problem, there is proposed a thermal conductive silicone composition that has high elongation after curing and can conform to the warpage during operation by blending a component containing an alkenyl group at the molecular chain terminal and a component containing an alkenyl group at a side chain and/or a terminal of the molecular chain. However, with the enlargement in package sizes in recent years, substrate warpage tends to increase, and conventional materials are thin in the material thickness and thus may be difficult to conform to the warpage. Whereas, using a thermal conductive filler with a large particle size is problematic in that the filling property is poor and the material thickness increases, resulting in high heat resistance and failing to exhibit sufficient heat dissipation performance.

CITATION LIST

Patent Literature

Patent Document 1: JP 2938428 B
Patent Document 2: JP 2938429 B
Patent Document 3: JP 3952184 B

SUMMARY OF INVENTION

Technical Problem

The present invention has been made in view of the above circumstances, and is aimed to provide a high thermal conductive silicone composition that can conform to the warpage of a substrate due to increased material thickness and can further maintain heat dissipation performance due to high thermal conductivity.

Solution to Problem

In order to solve the above problem, the present invention provides a high thermal conductive silicone composition, comprising:

(A) an organopolysiloxane having at least two aliphatic unsaturated hydrocarbon groups in one molecule and a kinematic viscosity at 25° C. of 100 to 100,000 $mm^2/s$;

(B) an aluminum powder having an average particle size of 50 μm or more;

(C) a thermal conductive filler having an average particle size of 0.1 to less than 50 μm;

(D) an organohydrogenpolysiloxane having two or more hydrogen atoms bonded to a silicon atom (Si—H groups) in one molecule, with [the number of Si—H groups in the component (D)]/[the number of alkenyl groups in the component (A)] of 0.5 to 1.5;

(E) a hydrolyzable organopolysiloxane represented by the following general formula (1) in an amount of 0.1 to 10% by mass relative to the total amount of the composition, (1)

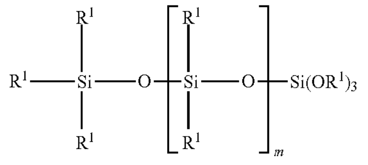

wherein $R^1$'s each represent a monovalent hydrocarbon group having 1 to 10 carbon atoms optionally having a substituent, and are identical to or different from one another, and "m" represents an integer of 5 to 100; and (F) a platinum group metal catalyst having an effective amount, wherein a sum of the component (B) and the component (C) accounts for 90 to 95% by mass relative to a total amount of the composition, and a thermal conductivity of the high thermal conductive silicone composition at 25° C. determined by a hot disc method in accordance with ISO 22007-2 is 7 W/m·K or more, and an absolute viscosity at 25° C. is 50 to 1,000 Pa·s.

The high thermal conductive silicone composition as described above can conform to the warpage of the substrate due to increased material thickness, and can maintain heat dissipation performance because of having high thermal conductivity.

In addition, the present invention is preferably a high thermal conductive silicone composition further including (G) a control agent selected from acetylene compounds, nitrogen compounds, organophosphorus compounds, oxime compounds, and organic chloro compounds that suppress catalytic activity of the component (F), in an amount of 0.1 to 5% by mass relative to the sum of the component (A).

The high thermal conductive silicone composition as described above can provide a sufficient shelf life or pot life and can improve the curing speed.

In addition, the present invention is preferably a high thermal conductive silicone composition wherein when the high thermal conductive silicone composition is heat-cured at 150° C. for 60 minutes to prepare a 2 mm thick sheet, followed by forming the obtained sheet into a No. 2 dumbbell shape in accordance with JIS K6251, elongation measured is 30% or more.

The high thermal conductive silicone composition as described above is unlikely to cause peeling during high temperature storage, and can have no risk of deterioration in heat resistance.

Advantageous Effects of Invention

As described above, in the present invention, blending an aluminum powder having an average particle size of 50 μm or more can increase the material thickness, provide high thermal conductivity, and maintain heat performance.

DESCRIPTION OF EMBODIMENTS

As described above, there has been a demand for the development of a high thermal conductive silicone composition that can conform to the warpage of the substrate and further maintain the heat dissipation performance.

As a result of intensive investigations to achieve the above goal, the present inventor has developed a high thermal conductive silicone composition that increases a material thickness to allow conforming to the warpage of a substrate, and further has high thermal conductivity to allow maintaining heat dissipation performance.

That is, the present invention is a high thermal conductive silicone composition, comprising:

(A) an organopolysiloxane having at least two aliphatic unsaturated hydrocarbon groups in one molecule and a kinematic viscosity at 25° C. of 100 to 100,000 $mm^2/s$;

(B) an aluminum powder having an average particle size of 50 μm or more;

(C) a thermal conductive filler having an average particle size of 0.1 to less than 50 μm;

(D) an organohydrogenpolysiloxane having two or more hydrogen atoms bonded to a silicon atom (Si—H groups) in one molecule, with [the number of Si—H groups in the component (D)]/[the number of alkenyl groups in the component (A)] of 0.5 to 1.5;

(E) a hydrolyzable organopolysiloxane represented by the following general formula (1) in an amount of 0.1 to 10% by mass relative to the total amount of the composition, (1)

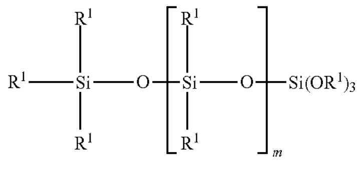

wherein $R^1$'s each represent a monovalent hydrocarbon group having 1 to 10 carbon atoms optionally having a substituent, and are identical to or different from one another, and "m" represents an integer of 5 to 100; and (F) a platinum group metal catalyst having an effective amount, wherein a sum of the component (B) and the component (C) accounts for 90 to 95% by mass relative to a total amount of the composition, and a thermal conductivity of the high thermal conductive silicone composition at 25° C. determined by a hot disc method in accordance with ISO 22007-2 is 7 W/m·K or more, and an absolute viscosity at 25° C. is 50 to 1,000 Pa·s.

Hereinafter, the present invention will be described in detail, but the present invention is not limited thereto.

Component (A)

The component (A) is an organopolysiloxane having at least two aliphatic unsaturated hydrocarbon groups in one molecule and a kinematic viscosity at 25° C. of 100 to 100,000 $mm^2/s$. The organopolysiloxane of the component (A) contains two alkenyl groups directly bonded to a silicon atom in one molecule, and may be linear or branched, or a mixture of two or more of these having different viscosities. Examples of the alkenyl group include a vinyl group, an allyl group, a 1-butenyl group, and a 1-hexenyl group, and the vinyl group is preferable from the viewpoints of ease of synthesis and cost. Examples of the remaining organic groups bonded to the silicon atom include: alkyl groups such as a methyl group, an ethyl group, a propyl group, a butyl group, a hexyl group, and a dodecyl group; aryl groups such as a phenyl group; and aralkyl groups such as a 2-phenylethyl group and a 2-phenylpropyl group, and examples thereof further include substituted hydrocarbon groups such as a chloromethyl group and a 3,3,3-trifluoropropyl group. Among these, the methyl group is preferable from the viewpoints of ease of synthesis and cost. The alkenyl group bonded to the silicon atom is preferably present at the terminal of the molecular chain of the organopolysiloxane. The kinematic viscosity of the organopolysiloxane at 25° C. measured by an Ubbelohde Ostwald viscometer is in the range of 100 to 100,000 $mm^2/s$, preferably 500 to 100,000 $mm^2/s$.

Component (B)

The component (B) is an aluminum powder having an average particle size of 50 μm or more, and functions as a thermal conductive filler for the high thermal conductive silicone composition of the present invention. The component (B) may be used singly or may be used in combination of two or more.

The shape of the component (B) is not particularly limited, and examples thereof include spherical, dendritic, scaly, acicular, and irregular shapes. In order to highly fill the component (B) into the high thermal conductive silicone composition, the particle shape of the component (B) is preferably spherical rather than dendritic, scaly, acicular, irregular, or other shapes with high bulk density.

The average particle size of the component (B) is 50 μm or more, preferably in the range of 55 to 100 μm, more preferably 55 to 80 μm. If the average particle size is less than 50 μm, the material thickness of the high thermal conductive silicone grease becomes too thin and thus may fail to conform to the warpage of a substrate. In the present invention, the average particle size is a volume-based volume average size and can be measured by Microtrac MT3300EX manufactured by Nikkiso Co., Ltd.

The filling amount of the component (B) is preferably in the range of 20 to 60% by mass relative to the total amount of the composition. If the filling amount is equal to or higher than the lower limit, the thermal conductivity of the composition will be high, and if it is equal to or lower than the upper limit, the composition will be uniform and oil separation will not occur.

Component (C)

The component (C) is a thermal conductive filler having an average particle size of 0.1 to less than 50 μm, and functions to improve the thermal conductivity of the highly thermal conductive silicone composition of the present invention. The component (C) enters the space between the components (B), thereby allowing improvement in the filling property of the entire thermal conductive filler (components (B) and (C)) in the composition. Examples of such thermal conductive fillers include an aluminum powder, a copper powder, a nickel powder, a gold powder, a metallic silicon powder, an aluminum nitride powder, a boron nitride powder, an alumina powder, a diamond powder, a carbon powder, an indium powder, a gallium powder, and a zinc oxide powder. The component (C) may be used singly or may be used in combination of two or more.

The component (C) is preferably an aluminum powder, an alumina powder, or a zinc oxide powder, more preferably an aluminum powder or a zinc oxide powder, from the viewpoints of thermal conductivity and availability.

The average particle size of the component (C) is in the range of 0.1 to less than 50 μm, preferably 0.2 to 45 μm, more preferably 0.2 to 40 μm. If the average particle size is less than 0.1 μm, the bulk density of the component (C) tends to increase, which may increase the viscosity of the composition and reduce workability. Whereas, if the average particle size is 50 μm or more, it becomes difficult to achieve the closest packing by combining the components (B) and (C).

The filling amount of the component (C) is preferably in the range of 30 to 70% by mass, more preferably in the range of 30 to 65% by mass, relative to the total amount of the composition. If the filling amount is equal to or more than the lower limit, the effect of adding the component (C) becomes easily obtained. Whereas, if the filling amount is equal to or less than the upper limit, the resulting composition will have a low viscosity and workability will be improved.

In the high thermal conductive silicone composition, the sum of the components (B) and (C) is in the range of 90 to 95% by mass, preferably 91 to 95% by mass, more preferably 92 to 95% by mass, relative to the total amount of the composition. If the above total amount is less than the lower limit, it may be difficult to achieve a thermal conductivity of 7 W/m·K for the composition. Whereas, if the total amount exceeds the upper limit, the composition will have a high viscosity and workability is lowered.

Component (D)

The component (D), the organohydrogenpolysiloxane, must have two or more hydrogen atoms directly bonded to a silicon atom (Si—H groups) in one molecule in order to form a reticulated composition by crosslinking, and may be linear or branched, or a mixture of two or more of these with different viscosities. Examples of the remaining organic groups bonded to the silicon atom include: alkyl groups such as a methyl group, an ethyl group, a propyl group, a butyl group, a hexyl group, and a dodecyl group; aryl groups such as a phenyl group; and aralkyl groups such as a 2-phenylethyl group and a 2-phenylpropyl group, and examples thereof further include substituted hydrocarbon groups such as a chloromethyl group and a 3,3,3-trifluoropropyl group. Among these, the methyl group is preferable from the viewpoints of ease of synthesis and cost.

The blending amount of the component (D) is in an amount of [the number of Si—H groups in the component (D)]/[the number of alkenyl groups in the component (A)] of 0.5 to 1.5, more preferably in the range of 0.7 to 1.3. If the blending amount of the component (D) is less than the above lower limit, the composition cannot be sufficiently reticulated, and the grease will not harden sufficiently, whereas if the blending amount exceeds the upper limit, the crosslink density may become too high and the elongation may decrease.

Component (E)

The component (E) is a hydrolyzable organopolysiloxane represented by the following general formula (1). The component (E) can treat the surface of the components (B) and (C), which are thermal conductive fillers, and if the component (B) or component (C) is highly filled in the silicone component, the fluidity of the silicone composition can be maintained and good handleability can be imparted to the composition.

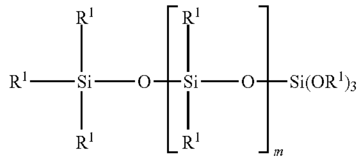

(1)

In the formula, $R^1$'s each represent a monovalent hydrocarbon group having 1 to 10 carbon atoms optionally having a substituent, and are identical to or different from one another, and "m" represents an integer of 5 to 100.

$R^1$'s in the above formula (1) each represent a monovalent hydrocarbon group having 1 to 10 carbon atoms optionally having a substituent, and are identical to or different from one another. Examples of $R^1$ include a methyl group. "m" is an integer of 5 to 100, preferably an integer of 10 to 60. If the value of "m" is less than 5, oil bleeding from the silicone composition may become prominent, and the reliability may deteriorate. In addition, if the value of "m" is more than 100, the wettability of the filler may not be sufficient.

The amount of the component (E) is in the range of 0.1 to 10% by mass, preferably 1 to 6% by mass, relative to the total amount of the composition. If the amount of the component (E) is less than the above lower limit, sufficient wettability may not be exhibited, and if the amount exceeds the above upper limit, bleeding from the composition may become prominent.

Component (F)

The component (F) is a platinum group metal catalyst and a component promoting the addition reaction between the aliphatic unsaturated hydrocarbon groups in the component (A) and the Si—H groups in the component (D). As the platinum group metal catalyst, conventionally known ones used for the addition reaction can be used. Examples thereof include platinum-based, palladium-based, and rhodium-based catalysts, and platinum or platinum compounds, which are relatively easily available, are preferable. Examples thereof include elemental platinum, platinum black, chloroplatinic acid, platinum-olefin complexes, platinum-alcohol complexes, and platinum coordination compounds. The platinum-based catalyst may be used singly or in combination of two or more.

The blending amount of the component (F) may be an effective amount as a catalyst, that is, an effective amount necessary to promote the addition reaction to cure the composition of the present invention. The blending amount is preferably 0.1 to 500 ppm, more preferably 1 to 200 ppm, on a mass basis, relative to the mass of the component (A) in terms of platinum group metal atoms. The amount of the catalyst within the above range is preferable because of providing the effect as a catalyst and being economical.

Component (G)

The high thermal conductive silicone composition of the present invention can further contain the component (G) as a control agent for suppressing the progress of the hydrosilylation reaction at room temperature (that is, suppresses the catalytic activity of the component (F)) to extend shelf life and pot life. As the control agent, conventionally known ones can be used, and acetylene compounds, nitrogen compounds, organic phosphorus compounds, oxime compounds, and organic chloro compounds are preferable.

If the blending amount of the component (G) is 0.1% by mass or more relative to the component (A), sufficient shelf life and pot life can be obtained, and if the blending amount is 5% by mass or less relative to the component (A), the curing speed can be maintained. Thus, the amount is preferably in a range of 0.1 to 5% by mass, more preferably in a range of 0.1 to 1% by mass, still more preferably in a range of 0.1 to 0.5% by mass. The component (G) may be diluted with toluene or the like for better dispersibility in the high thermal conductive silicone composition.

Other Components

In addition to the above components (A) to (G), the high thermal conductive silicone composition of the present invention may contain a conventionally known antioxidant such as 2,6-di-t-butyl-4-methylphenol as necessary in order to prevent deterioration of the addition-curable silicone composition. Furthermore, a heat-resistant improver, an adhesion aid, a mold release agent, a dye, a pigment, a flame retardant, an anti-settling agent, a thixotropy improver, or the like can be blended as necessary.

In order to produce the grease of the present invention, the components (A) to (G) and other components are mixed in a mixer such as Trimix, Twinmix, and Planetary Mixer (registered trademarks, all manufactured by Inoue MFG., Inc.), Ultra Mixer (registered trademark, manufactured by Mizuho Industrial Co., Ltd.), and Hibis Disper Mix (registered trademark, manufactured by Tokushu Kika Kogyo Co., Ltd.).

In addition, the high thermal conductive silicone composition of the present invention may be mixed while being heated, and the heating conditions are not particularly limited. The temperature is typically 25 to 220° C., preferably 40 to 200° C., more preferably 50 to 200° C., and the time is typically 3 minutes to 24 hours, preferably 5 minutes to 12 hours, more preferably 10 minutes to 6 hours. Additionally, deaeration may be performed during the heating.

The absolute viscosity of the high thermal conductive silicone composition of the present invention, measured at 25° C. using a Malcolm viscometer (type PC-1TL), is in the range of 50 to 1,000 Pa·s, preferably 100 to 800 Pa·s, more preferably 150 to 600 Pa·s. If the absolute viscosity is less than the lower limit of the above range, workability may be deteriorated, for example, sedimentation of the thermal conductive filler occurs over time during storage. In addition, if the absolute viscosity exceeds the upper limit of the above range, extensibility becomes poor, and workability may be deteriorated.

The high thermal conductive silicone composition of the present invention has a thermal conductivity of 7 W/m·K or more in the hot disc method in accordance with ISO 22007-2. A higher thermal conductivity is preferable, and therefore the upper limit cannot be set, but it may be 30 W/m·K or less, for example. Thermal conductivity can be measured with Model QTM-500 manufactured by Kyoto Electronics Manufacturing Co., Ltd.

The high thermal conductive silicone composition of the present invention is heat-cured at 150° C. for 60 minutes to prepare a 2 mm thick sheet, followed by forming the obtained sheet into a No. 2 dumbbell shape in accordance with JIS K6251, and elongation measured is preferably 30% or more, more preferably 35% or more, still more preferably 40% or more. A higher elongation is preferable, and therefore the upper limit cannot be set, but it may be 200% or less, for example. If the elongation (elongation at break) is 30% or more, peeling is unlikely to occur during high temperature storage, and there is no risk of deterioration in heat resistance.

EXAMPLES

Hereinafter, the present invention will be specifically described using Examples and Comparative Examples, but the present invention is not limited thereto.

<Test of Composition>

A test on the effect of the present invention was performed as follows.

[Viscosity]

The absolute viscosity of the high thermal conductive silicone composition was measured at 25° C. by using a Malcolm viscometer (type PC-1TL).

[Thermal Conductivity]

Each of high thermal conductive silicone compositions was poured into a 3 cm thick mold, the mold was covered with kitchen wrap, and the thermal conductivity at 25° C. was measured by a hot disc method in accordance with ISO 22007-2 using Model QTM-500 manufactured by Kyoto Electronics Manufacturing Co., Ltd.

[Heat Resistance Measurement]

A high thermal conductive silicone composition was sandwiched between a 15 mm×15 mm×1 mmt Si chip and a 15 mm×15 mm×1 mmt Ni plate, and the high thermal conductive silicone composition was cured by heating in an oven at 150° C. for 60 minutes to prepare a test piece for heat resistance measurement. Then, the test piece was allowed to stand at 150° C. for 1000 hours and changes in heat resistance were observed. This heat resistance measurement was performed by NanoFlash (LFA447 manufactured by Netzsch Japan K.K.).

[Elongation at Break]

Each of high thermal conductive silicone compositions was cured by heating at 150° C. for 60 minutes to prepare a 2 mm thick sheet, followed by forming the obtained sheet into a No. 2 dumbbell shape in accordance with JIS K6251, and the elongation at break was measured. The elongation at break was measured by AGS-X (manufactured by Shimadzu Corporation).

[Hardness of Cured Product]

A high thermal conductive silicone composition was cured by heating in an oven at 150° C. for 60 minutes to prepare a test piece for measuring the hardness of the cured product. The hardness of the cured product was measured by Asker C in accordance with JIS S 6050:2008.

<Composition Preparation>

The following components for forming the high thermal conductive silicone composition of the present invention were prepared. The kinematic viscosity indicates the value at 25° C. measured by an Ubbelohde-type Ostwald viscometer.

The average particle size is a volume-based volume average size and was measured by Microtrac MT3300EX manufactured by Nikkiso Co., Ltd.

Component (A)

A-1: Dimethylpolysiloxane having a kinematic viscosity at 25° C. of 1,500 $mm^2/s$ in which both terminals were blocked with trimethylsilyl groups A-2: Dimethylpolysiloxane having a kinematic viscosity at 25° C. of 30,000 $mm^2/s$ in which both terminals were blocked with dimethylvinylsilyl groups Component (B)

B-1: Aluminum powder with an average particle size of 60 μm

B-2: Aluminum powder with an average particle size of 45 μm

Comparative Example

Component (C)

C-1: Aluminum powder with an average particle size of 10 μm

C-2: Aluminum powder with an average particle size of 1.5 μm

C-3: Zinc oxide powder with an average particle size of 1.0 μm

Component (D)

Organohydrogenpolysiloxanes represented by the following formulae (D-1) to (D-3)

(D-1)

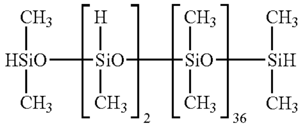

(D-2)

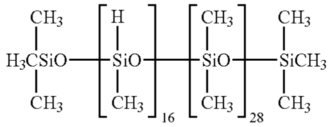

(D-3)

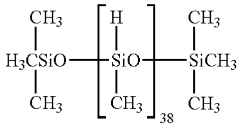

Component (E)

Hydrolyzable organopolysiloxane represented by the following formula (E-1)

(E-1)

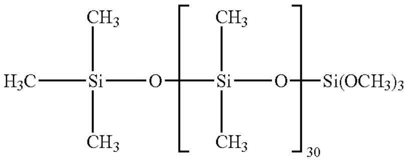

Component (F)

F-1: Solution of a platinum-divinyltetramethyldisiloxane complex blocked at both terminals with dimethylvinylsilyl groups dissolved in a dimethylpolysiloxane having a kinematic viscosity at 25° C. of 600 $mm^2/s$; containing 1% by mass of platinum atoms Component (G)

G-1: 1-ethynyl-1-cyclohexanol

Heat resistance improver: a compound represented by the following formula

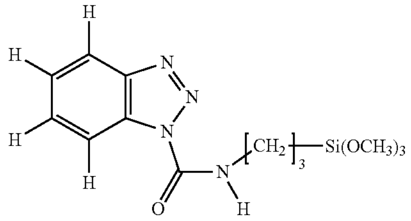

The components (A) to (G) and the heat resistance improver were blended as follows to provide silicone compositions of Examples 1 to 6 and Comparative Examples 1 to 6.

Specifically, the components (A), (B), (C), and (E) were added to a 5-liter planetary mixer (manufactured by Inoue MFG., Inc.) and mixed at 170° C. for 1 hour. After cooling to room temperature, the components (F), (G), and (D) and the heat resistance improver were added and mixed uniformly to prepare a silicone composition.

TABLE 1

| | | Example | | | | | |
|---|---|---|---|---|---|---|---|
| | | 1 | 2 | 3 | 4 | 5 | 6 |
| Component (A) | A-1 | 60 | 60 | 50 | 60 | 60 | 50 |
| | A-2 | 40 | 40 | 50 | 40 | 40 | 50 |
| Component (B) | B-1 | 4230 | 5593 | 5593 | 8507 | 8507 | 8507 |
| | B-2 | | | | | | |
| Component (C) | C-1 | 1890 | 2499 | 2499 | 3801 | 3801 | 3801 |
| | C-2 | 1440 | 1904 | 1904 | 2896 | 2896 | 2896 |
| | C-3 | 1440 | 1904 | 1904 | 2896 | 2896 | 2896 |
| Component (D) | D-1 | 11.8 | 11.8 | 7.14 | | | |
| | D-2 | | | 0.84 | 3.23 | 2.58 | 1.08 |
| | D-3 | | | | | 0.22 | 0.36 |
| Component (E) | E-1 | 500 | 600 | 600 | 900 | 900 | 900 |
| Component (F) | F-1 | 1.62 | 1.62 | 1.62 | 1.62 | 1.62 | 1.62 |
| Component (G) | G-1 | 0.35 | 0.35 | 0.35 | 0.35 | 0.35 | 0.35 |

TABLE 1-continued

| | Example | | | | | |
|---|---|---|---|---|---|---|
| | 1 | 2 | 3 | 4 | 5 | 6 |
| Heat resistance improver | 0.06 | 0.06 | 0.06 | 0.06 | 0.06 | 0.06 |
| Content of components (B) and (C) (% by mass) | 93.6 | 94.3 | 94.4 | 94.7 | 94.7 | 94.8 |
| [Si—H of component (D)]/ [Si—Vi of component (A)] (number ratio) | 1.0 | 1.0 | 1.0 | 1.0 | 1.0 | 1.0 |
| Viscosity [Pa · s] | 215 | 280 | 300 | 310 | 315 | 310 |
| Thermal conductivity [W/m · K] | 7.5 | 9.1 | 9.4 | 10.1 | 10.2 | 10.2 |
| Hardness of cured product (Asker C) | 20 | 14 | 18 | 20 | 21 | 17 |
| Elongation at break [%] | 60 | 40 | 38 | 35 | 35 | 40 |
| Heat resistance [$mm^2K/W$] | 17 | 17 | 18 | 16 | 17 | 17 |
| Heat resistance at 150° C. after 1,000 hr [$mm^2K/W$] | 16 | 17 | 17 | 17 | 16 | 16 |

TABLE 2

| | | Comparative Example | | | | | |
|---|---|---|---|---|---|---|---|
| | | 1 | 2 | 3 | 4 | 5 | 6 |
| Component (A) | A-1 | 60 | 60 | 60 | 60 | 60 | 60 |
| | A-2 | 40 | 40 | 40 | 40 | 40 | 40 |
| Component (B) | B-1 | 1645 | 9400 | | 5593 | 5593 | 11900 |
| | B-2 | | | 3018 | | | |
| Component (C) | C-1 | 735 | 4200 | 2518 | 2499 | 2499 | |
| | C-2 | 560 | 3200 | 2009 | 1904 | 1904 | |
| | C-3 | 560 | 3200 | 1545 | 1904 | 1904 | |
| Component (D) | D-1 | 11.8 | | | 18.8 | 5.3 | |
| | D-2 | | 2.58 | 2.58 | | | 2.58 |
| | D-3 | | 0.22 | 0.22 | | | 0.22 |
| Component (E) | E-1 | 320 | 900 | 600 | 600 | 600 | 600 |
| Component (F) | F-1 | 1.08 | 1.62 | 1.62 | 1.62 | 1.62 | 1.62 |
| Component (G) | G-1 | 0.23 | 0.35 | 0.35 | 0.35 | 0.35 | 0.35 |
| Heat resistance improver | | 0.06 | 0.06 | 0.06 | 0.06 | 0.06 | 0.06 |
| Content of components (B) and (C) (% by mass) | | 89.0 | 95.2 | 94.7 | 94.3 | 94.4 | 94.4 |
| [Si—H of component (D)]/ [Si—Vi of component (A)] (number ratio) | | 1.0 | 1.0 | 1.0 | 1.6 | 0.45 | 1.0 |
| Viscosity [Pa · s] | | 250 | *1 | 310 | 275 | 270 | *3 |
| Thermal conductivity [W/m · K] | | 5.1 | | 7.2 | 9.1 | 9.3 | |
| Hardness of cured product (Asker C) | | 20 | | 22 | 42 | *2 | |
| Elongation at break [%] | | 75 | | 36 | 15 | | |
| Heat resistance [$mm^2K/W$] | | 16 | | 9 | 18 | | |
| Heat resistance at 150° C. after 1,000 hr [$mm^2K/W$] | | 17 | | 16 | 22 | | |

*1: unmeasurable because composition did not become greasy
*2: unmeasurable because composition was not cured
*3: unmeasurable because silicone oil separated, and composition became ununiform From the results in Tables 1 and 2, the high thermal conductive silicone compositions of Examples 1 to 6, which satisfy the requirements of the present invention, had a thermal conductivity of 7 W/m·K or more, and the heat resistance hardly changed after high temperature storage. In Comparative Example 1, in which the sum of the components (B) and (C), which are the thermal conductive fillers, was small, sufficient thermal conductivity was not obtained, and in Comparative Example 2, the composition did not become greasy because of too large content of the thermal conductive filler. In addition, in Comparative Example 3, an aluminum powder having an average particle size of less than 50 μm was contained as the component (B), and the material thickness was thin, thereby the heat resistance during high temperature storage deteriorated. Furthermore, in Comparative Examples 4 and 5, when the ratio of [the number of Si—H groups in component (D)]/[the number of Si-Vi groups in component (A)] was too low, the composition was not sufficiently cured, and in contrast, when the ratio was too high, the composition became too hard, and the elongation became low. Therefore, the heat resistance after high temperature storage deteriorated. In Comparative Example 6, only the component (B) was used as the thermal conductive filler, and the filling property deteriorated, resulting in separation of silicone oil and ununiform composition. Therefore, the high thermal conductive silicone composition of the present invention has high thermal conductivity and can maintain the heat dissipation performance without deteriorating heat resistance after high temperature storage.

INDUSTRIAL APPLICABILITY

The high thermal conductive silicone composition of the present invention can conform to large warpage of a substrate due to increased material thickness and can further secure high heat performance even with the increased material thickness due to having high thermal conductivity. In addition, the high thermal conductive silicone composition of the present invention has high elongation, so that the heat resistance after high temperature storage does not deteriorate, and the composition of the present invention can be used particularly suitably as a highly reliable heat dissipation grease for removing heat from electronic components that generate heat during use.

It should be noted that the present invention is not limited to the above-described embodiments. The embodiments are just examples, and any examples that substantially have the same feature and demonstrate the same functions and effects as those in the technical concept disclosed in claims of the present invention are included in the technical scope of the present invention.

The invention claimed is:

1. A high thermal conductive silicone composition, comprising:

(A) an organopolysiloxane having at least two aliphatic unsaturated hydrocarbon groups in one molecule and a kinematic viscosity at 25° C. of 100 to 100,000 $mm^2/s$;

(B) an aluminum powder having an average particle size of 50 μm or more;

(C) a thermal conductive filler having an average particle size of 0.1 to less than 50 μm;

(D) an organohydrogenpolysiloxane having two or more hydrogen atoms bonded to a silicon atom (Si—H groups) in one molecule, with [the number of Si—H groups in the component (D)]/[the number of alkenyl groups in the component (A)] of 0.5 to 1.5;

(E) a hydrolyzable organopolysiloxane represented by the following general formula (1) in an amount of 0.1 to 10% by mass relative to a total amount of the composition, (1)

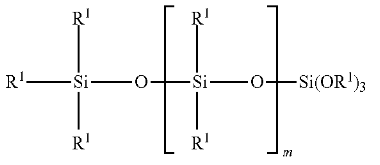

wherein $R^1$'s each represent a monovalent hydrocarbon group having 1 to 10 carbon atoms optionally having a substituent, and are identical to or different from one another, and "m" represents an integer of 5 to 100; and (F) a platinum group metal catalyst having an effective amount;

wherein a sum of the component (B) and the component (C) accounts for 90 to 95% by mass relative to a total amount of the composition, and a thermal conductivity of the high thermal conductive silicone composition at 25° C. determined by a hot disc method in accordance with ISO 22007-2 is 7 W/m·K or more, and an absolute viscosity at 25° C. is 50 to 1,000 Pa·s.

2. The high thermal conductive silicone composition according to claim 1, further comprising, (G) a control agent selected from acetylene compounds, nitrogen compounds, organophosphorus compounds, oxime compounds, and organic chloro compounds that suppress catalytic activity of the component (F), in an amount of 0.1 to 5% by mass relative to a sum of the component (A).

3. The high thermal conductive silicone composition according to claim 1, wherein when the high thermal conductive silicone composition is heated and cured at 150° C. for 60 minutes to prepare a 2 mm thick sheet, followed by forming the obtained sheet into a No. 2 dumbbell shape in accordance with JIS K6251, elongation measured is 30% or more.

4. The high thermal conductive silicone composition according to claim 2, wherein when the high thermal conductive silicone composition is heated and cured at 150° C. for 60 minutes to prepare a 2 mm thick sheet, followed by forming the obtained sheet into a No. 2 dumbbell shape in accordance with JIS K6251, elongation measured is 30% or more.

* * * * *